Feb. 23, 1932. C. E. SUMMERS 1,846,282
CYLINDER WALL LUBRICATION CONTROL
Filed Oct. 6, 1928

Inventor
Caleb E. Summers
By
Blackmore, Spencer & Hick
Attorney

Patented Feb. 23, 1932

1,846,282

UNITED STATES PATENT OFFICE

CALEB E. SUMMERS, OF PONTIAC, MICHIGAN, ASSIGNOR TO GENERAL MOTORS CORPORATION, OF DETROIT, MICHIGAN, A CORPORATION OF DELAWARE

CYLINDER WALL LUBRICATION CONTROL

Application filed October 6, 1928. Serial No. 310,872.

This invention relates to lubricating systems for internal combustion engines and has particular reference to a lubricant control for the piston and cylinder.

A major problem in the design and construction of internal combustion engines is to secure adequate lubrication of the pistons without an excess of oil under certain operating conditions. Most oil control means depends upon accurate fits of certain parts such as, pistons and rings, and upon other conditions such as, ring tension, condition of scraping edges etc., all of which are subject to variation with wear.

The problem of oil control is fairly difficult in vertical motors having relatively long stroke in proportion to bore. The condition is made more difficult when the number of cylinders is increased; when the bore is relatively large in proportion to stroke; or in V-type engines when the connecting rod is short and the cylinders are inclined at an angle to the vertical. Since there are certain economic advantages in the production of an engine of the V-type, it becomes necessary to devise an oil control means which is peculiarly adapted to this type of engine and the efficiency of which is not greatly effected by the variables introduced by manufacturing limits, or by wear, temperature, and quality of oil.

This invention consists essentially of means for the forced return to the crankcase at each stroke of any excess oil which is trapped between the piston rings. The object of the invention is accomplished by providing a passage or recess in the cylinder wall which communicates with the spaces between the piston rings when the piston is in its lowermost position. A passage or opening in the piston communicates with one end of this recess to allow the excess oil to flow to the interior of the piston and drop to the oil pan. The recess in the cylinder wall is preferably placed at the lowermost side of the inclined wall.

On the drawings three piston rings are shown although this number may be varied, and the lands between the rings are of a diameter slightly less than the piston diameter. These lands, together with the cylinder walls form a plurality of annular spaces in which the oil may collect. When the motor is in operation the average pressure, due to compression and explosion, is greater on the upper or explosion side of the piston than is the crankcase pressure on its lower crankcase side. Therefore, there is a tendency for compression and explosion gases to leak past the top and middle piston rings so that there is a pressure gradient which is downward in steps from the position between the two uppermost rings, the two lowermost rings, and the crankcase.

In order to utilize this trapped pressure as a means to force any excess oil back to the crankcase, I provide in the cylinder side, a passage or conduit which is so positioned that when the piston is near its lowest point in the stroke, the passage establishes a communication successively between the spaces between the piston rings and the crankcase, the communication being completed by the opening in the wall of the piston. The cylinder wall conduit or passage extends downwardly a sufficient distance to register with the piston passage or opening when the annular spaces between the piston rings have registered with the upper end of the cylinder wall conduit or passage.

It is well known that in a motor having inclined cylinders, the oil tends to accumulate in the annular spaces or passages at the lower side. The gas pressure, regardless of the point at which it has entered these annular passages is equalized so when communication is established between the annular spaces and the cylinder wall passage, a flow in the direction of the arrows, Fig. 2, results. This movement of the gas forces out any oil which is trapped at the lower side of the annular spaces or passages and urges the oil or oil film in the annular passages, which would otherwise not be greatly affected by gravity, out through the passages in the cylinder and piston so the accumulated oil is not only permitted to flow out but is actually forced out.

It will be understood that while this invention has been designed primarily to control oil under the unusually difficult conditions above mentioned, it is not limited in use to a motor of this particular type. Also the method of providing the cylinder passage is capable of wide variation and may consist of drilled holes, or an external tube returning to the crankcase, or other means which will effectively establish a passage communicating pressure and causing the flow of trapped oil from the annular spaces to the crankcase when the piston is near its lowest position.

Referring to the drawings.

Figure 2:
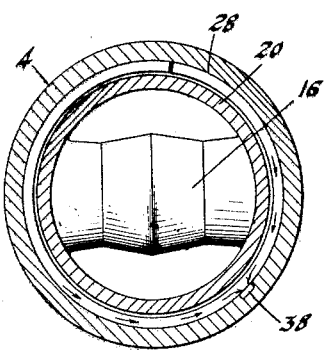
Fig. 2 is a section on the line 2—2 of Fig. 1.
Figure 1:
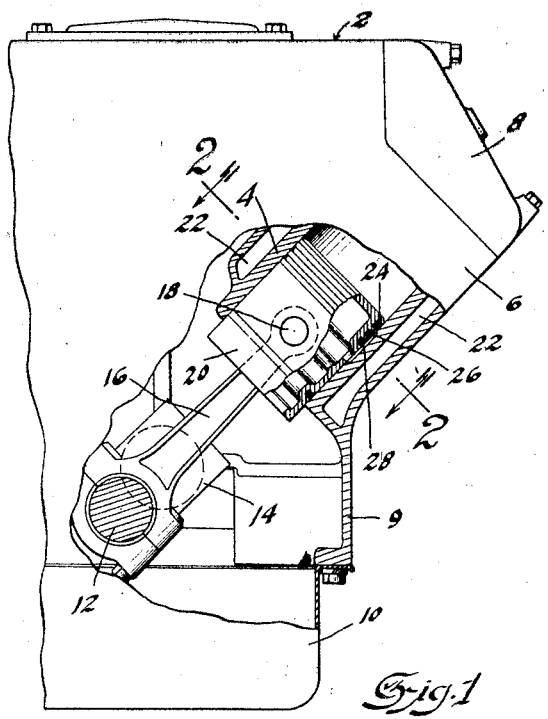
Fig. 1 shows a portion of a V-type or inclined cylinder internal combustion engine with parts broken away and shown in section to illustrate the invention.

Referring to the drawings, the numeral 2 indicates an internal combustion engine having the plurality of inclined cylinders 4. But one bank 6 of these cylinders is shown, although the opposite side of the engine has a similar bank. The usual head 8, crank case 9 and oil pan 10 are provided. The numeral 12 indicates the crank shaft and 14 one of the throws thereof. Connected to the crank shaft are the piston rods 16 pivoted as at 18 to the pistons 20 which operate in the cylinders 4. The engine 2 is also provided with the usual water circulating system indicated at 22.

The piston 20 is provided with three piston rings 24, 26 and 28 and between these rings are found the lands 30 and 32, the diameters of which are slightly less than the diameter of the piston 20. This difference in diameters will form the annular spaces 34 and 36, the walls of the cylinder and the faces of the lands defining the walls of the annular spaces 34 and 36.

Adjacent the lower portion of the cylinder and conforming substantially to the lowermost portion of the piston 20 is the passage or recess 38 in the cylinder wall. Each cylinder of the engine is provided with a similar recess, similarly located. The piston 20 is provided with a passage or opening 40 which conforms to the lowermost portion of the passage 38 when the piston is in its lowermost position. The passages 38 and 40 when in communication with each other form a continuous passage 41 and the position of the parts in the lowermost position of the piston is shown in Figs. 1 to 5 inclusive.

Figure 3:
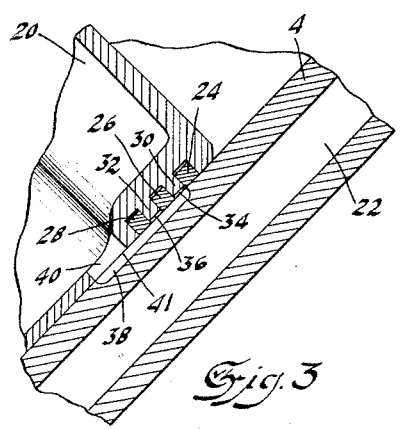
Fig. 3 is an enlarged detail of the recess in the cylinder wall and the piston in its lowermost position.

In the piston position illustrated in Figs. 1 to 5 inclusive, the gas pressure above the piston or on the explosion side is greater than the gas pressure on the crank case. There is, accordingly, a greater pressure in the annular space 34 than there is in the space 36 and also a greater pressure in the space 36 than in the crank case. This difference in pressure is due to the fact that the combustion gases leak somewhat between the piston and the cylinder and the nearer the space is to the crankcase the less is the pressure. Inasmuch as the recess 38 is at the lowermost portion of the cylinder wall, any oil trapped in the annular spaces 34 and 36 will flow to the lowermost point or to the passage or recess 38. When the spaces 36 or 34 and the passage 40 conform to the recess 38, the gas pressure in the annular spaces 34 and 36 will force the lubricant from the annular spaces into the passage 38 and out through the piston passage 40 to the interior of the piston from where it will drop into the crankcase. As shown in Fig. 3, the passage 40 conforms to the passage 38 simultaneously with the spaces 34 and 36. The flow of oil in the annular spaces 34 and 36 is indicated by the arrows in Fig. 2.

From the above description and operation it will be apparent that any excess lubricant caught or trapped in the spaces 34 and 36 will be forced to the crankcase on each explosion stroke of the piston.

Figure 4:
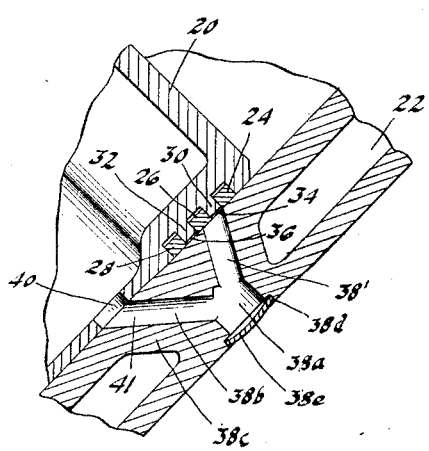
Figs. 4 and 5 are modifications of the structure shown in Fig. 3.

Referring to Fig. 4, it will be seen that the piston is in all respects similar to that shown in Fig. 3. The difference in the two figures resides in the passage 38. In Fig. 4, 38' indicates the passage corresponding to the passage 38 in Fig. 3. The passage 38' is formed by boring the passage 38a and 38b from the exterior of the crankcase. These passages are bored in an integral portion 38c in the engine block. The opening 38d on the side of the engine block is closed by an expansion plug 38e in a well known manner. The operation of the construction is identically the same as the operation of the construction of Fig. 3.

Figure 5:
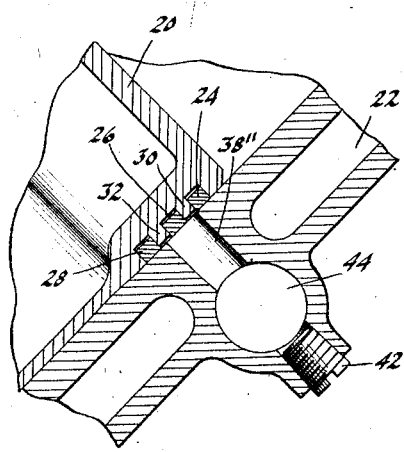

Referring to Fig. 5, the piston is in all respects similar to the piston of Fig. 3, except that the passage 40 is not present. The passage 38'' is formed by drilling the side of the engine block and then closing the opening by means of a suitable plug 42. 44 indicates a passage to which a suitable tube is attached which will conduct or lead the oil back to the oil pan 10. The operation of the structure of Fig. 5 is essentially the same as that of Figs. 3 and 4.

I claim:

1. In a lubricating system for engines having cylinders and pistons, a plurality of spaced rings on said piston, and means in the cylinder and piston adapted to carry off excess lubricant from the rings.

2. In a lubricating system for engines having cylinders and pistons, a plurality of rings on each piston, lands between said rings having a diameter less than the diameter of the piston and with the cylinder walls defining annular spaces, and means in the cylinder and piston for conducting away excess lubricant from said spaces.

3. In a lubricating system for engines having cylinders and pistons, a plurality of rings on said piston, lands between said rings, said lands and the cylinder wall defining a plurality of annular spaces, and means in the cylinder and piston operative in substantially the lowermost position of the piston to conduct away excess lubricant from the lands.

4. In a lubricating system for internal combustion engines having cylinders and pistons, means for causing the pressure of the exhaust gas to force the excess oil from the piston.

5. In a lubricating system for engines having cylinders and pistons, a plurality of spaced rings on said piston, and passages in the cylinder and piston adapted to carry off excess lubricant from the rings.

6. In a lubricating system for engines having cylinders and pistons, a plurality of rings on each piston, lands between said rings having a diameter less than the diameter of the piston and with the cylinder walls defining annular spaces, and means in the cylinder and piston for conducting away excess lubricant from said spaces, said means comprising a passage within the cylinder wall and an opening in the piston.

7. In a lubricating system for internal combustion engines having cylinders and pistons, means for causing the pressure of the exhaust gas to force the excess oil from the piston, said means including passages within the cylinder wall and piston.

8. In a lubricating system for engines having a cylinder and a piston, a plurality of piston rings on said piston, a groove in said cylinder at times mating with said rings, said piston having an opening, said opening mating with said groove when said piston is in its lowermost position to cause the flow of excess oil from said rings.

9. In a lubricating system for engines having a cylinder and a piston, a plurality of piston rings on said piston, a passage in the wall of said cylinder at times mating with said rings and having its end portions spaced apart for a distance greater than the width occupied by the piston rings on the piston, said piston having an opening which at times mates with said passage to cause excess oil to flow from the rings.

In testimony whereof I affix my signature.

CALEB E. SUMMERS.